United States Patent
Antoine et al.

(10) Patent No.: US 9,558,603 B2
(45) Date of Patent: Jan. 31, 2017

(54) SMARTCARD RECEIVING DEVICE FOR PROVIDING A REMOTE COMMUNICATION WITH SWITCHING MEANS

(75) Inventors: Matthieu Antoine, Meudon (FR); Michel Thill, Meudon (FR)

(73) Assignee: GEMALTO SA, Meudon (FR)

( * ) Notice: Subject to any disclaimer, the term of this patent is extended or adjusted under 35 U.S.C. 154(b) by 751 days.

(21) Appl. No.: 13/997,252

(22) PCT Filed: Dec. 15, 2011

(86) PCT No.: PCT/EP2011/072972
§ 371 (c)(1),
(2), (4) Date: Sep. 19, 2013

(87) PCT Pub. No.: WO2012/084698
PCT Pub. Date: Jun. 28, 2012

(65) Prior Publication Data
US 2014/0015639 A1    Jan. 16, 2014

(30) Foreign Application Priority Data
Dec. 22, 2010    (EP) ..................................... 10306486

(51) Int. Cl.
*G05B 19/00* (2006.01)
*G07C 9/00* (2006.01)
(Continued)

(52) U.S. Cl.
CPC ......... *G07C 9/00007* (2013.01); *G06K 7/0021* (2013.01); *G06Q 20/352* (2013.01);
(Continued)

(58) Field of Classification Search
None
See application file for complete search history.

(56) References Cited

U.S. PATENT DOCUMENTS 6,045,043 A * 4/2000 Bashan .............. G06K 19/0723
235/441
8,306,588 B2 * 11/2012 Wakabayashi ...... H04M 1/0254
343/702
(Continued)

FOREIGN PATENT DOCUMENTS

JP    2010044739 A    2/2010

OTHER PUBLICATIONS

PCT/EP2011/072972 International Search Report, Jan. 17, 2012, European Patent Office, P.B. Patentlaan 2 NL—2280 HV Rijswijk.
(Continued)

*Primary Examiner* — Curtis King
(74) *Attorney, Agent, or Firm* — The Jansson Firm; Pehr B. Jansson

(57) ABSTRACT

The invention relates to a smartcard receiving device, comprising a contact interface (11) for communicating with the received smartcard (2); a remote communication interface (13) for communicating with a first remote device (3); a protocol bridge (12) designed to establish a transaction with the received smartcard (2) through the contact interface (11). The smartcard receiving device further comprises a communicating device detector (14, 15) adapted to detect a second remote device (5) communicating according to a remote communication protocol different from the communication protocol used by said remote communication interface (13). The protocol bridge (12) interrupts the transaction with the received smartcard (2) when the second remote device (5) communicating according to said different remote communication protocol is detected.

15 Claims, 1 Drawing Sheet

(51) Int. Cl.
  *G06K 7/00* (2006.01)
  *G06Q 20/34* (2012.01)
  *G07F 7/08* (2006.01)
  *G07F 7/10* (2006.01)

(52) U.S. Cl.
  CPC ....... *G06Q 20/3574* (2013.01); *G07F 7/0886* (2013.01); *G07F 7/10* (2013.01)

(56) References Cited

U.S. PATENT DOCUMENTS

| | | | | |
|---|---|---|---|---|
| 8,807,440 | B1* | 8/2014 | von Behren | G06Q 20/367 235/492 |
| 2003/0189096 | A1 | 10/2003 | Markkanen et al. | |
| 2004/0232248 | A1* | 11/2004 | Cho | G06K 19/07 235/492 |
| 2005/0205678 | A1* | 9/2005 | Ponert | G07C 9/00111 235/492 |
| 2006/0086806 | A1* | 4/2006 | Conraux | G06K 7/0008 235/492 |
| 2006/0186211 | A1* | 8/2006 | Kim | G06K 7/0021 235/492 |
| 2006/0279410 | A1* | 12/2006 | Mitani | G06K 7/0008 340/10.6 |
| 2007/0164118 | A1* | 7/2007 | Degauque | G06K 7/0008 235/492 |
| 2009/0036166 | A1 | 2/2009 | Yen et al. | |
| 2009/0137276 | A1* | 5/2009 | Baldischweiler | G06F 3/0617 455/558 |
| 2009/0275364 | A1* | 11/2009 | Morel | G06K 7/10297 455/558 |
| 2010/0029202 | A1* | 2/2010 | Jolivet | G06K 7/0008 455/41.1 |
| 2010/0090805 | A1* | 4/2010 | Libotte | G06K 19/0719 340/10.2 |
| 2010/0273469 | A1* | 10/2010 | Seban | G06K 19/07309 455/418 |
| 2011/0053637 | A1* | 3/2011 | Filipovic | H04B 1/38 455/552.1 |

OTHER PUBLICATIONS

PCT/EP2011/072972 Written Opinion of the International Searching Authority, Jan. 17, 2012, European Patent Office, P.B. Patentlaan 2 NL—2280 HV Rijswijk.

* cited by examiner

SMARTCARD RECEIVING DEVICE FOR PROVIDING A REMOTE COMMUNICATION WITH SWITCHING MEANS

BACKGROUND

The present invention generally relates to smartcards, and more particularly relates to dual interface smartcards having only one of its communication interfaces simultaneously available.

Smart cards are plastic cards having an embedded smartcard chip. A smartcard chip is an integrated microcontroller generally comprising a central processing unit, a random access memory, a ROM memory and an EEPROM memory. A dual interface smartcard is a smartcard provided with a contact and a contactless communication interfaces. The integrated microcontroller is connected to both communication interfaces to perform transactions. Such a smartcard can carry out a transaction through its contact interface when it is hosted in a smartcard reader. Such a smartcard can carry out a transaction through its contactless interface when a contactless reader is located in near-field area. Smartcards are widely used to store sensitive information such as cryptographic keys or software routines that implement valuable algorithms or know-how.

Both the contact and contactless interfaces can be inappropriate for specific applications. For instance, an access to secured computer networks can request a user authentication. An authentication through the contact interface of the smartcard requires connecting a smartcard reader to a terminal of the user. An authentication transaction through the smartcard contact interface can be carried out only when the smartcard is inserted inside the smartcard reader. Thus, the user has to leave the smartcard inside the smartcard reader as long as he wants to keep his access granted to the secured network. However, this smartcard can be used to have the user authenticated by further devices as well. For instance, the smartcard can be used to open security doors to/from restricted areas through its contactless interface. If a user wants to cross a door to enter or leave a restricted area, he has to remove his smartcard from the smartcard reader to authenticate and open the door.

Further developments have been made to allow the user to keep his smartcard in his pockets while he accesses the secured network, to allow such a user to move inside the room without disconnecting the smartcard from the user terminal and to avoid the necessity of connecting specific smartcard readers to the user terminal. A badge holder has notably been designed to enhance the communication range of the smartcard. Such a badge holder receives the smartcard and can communicate with the smartcard through a contact interface. The badge holder further comprises a Bluetooth interface (Bluetooth is defined in the IEEE 802.15 standards). Bluetooth communication system has the main advantage of being already widely integrated on most of the distributed computers and smart-phones. The contact interface and the Bluetooth interface of the badge holder are connected through a protocol translator or bridge. The protocol bridge establishes a communication between the smartcard using its contact interface (for instance through an ISO 7816 protocol) and the Bluetooth interface (through an UART interface for instance).

However, the use of such a badge holder still has some drawbacks. Indeed, the user may be unable to unlock a door and leave the room if a communication between the smartcard (using its contact interface) and the user terminal is active. Indeed, a dual interface smartcard is in most cases unable to perform a transaction on its contact interface concurrently with a transaction on its contactless interface. Thus, if a user leaves his desk and approaches a door he wishes to unlock, the badge holder hosted in his pocket will still be communicating with his terminal in vicinity. The transaction through the contact interface of the smartcard has to be ended first. Thus, the smartcard is unable to carry out a transaction with the door through its contactless interface while a communication through its contact interface is active. The user has to deliberately end the transaction between his terminal and the smartcard.

Thus, there is a need for an electronic circuit or a smartcard solving one of these drawbacks. The invention proposes a smartcard receiving device, comprising a contact interface, a remote communication interface, a protocol bridge and a communicating device detector. The contact interface is designed for communicating with the received smartcard. The remote communication interface designed for communicating with a first remote device. The protocol bridge is designed to establish a transaction with the received smartcard through the contact interface and to translate the data received according to the protocol of one of said interfaces into the protocol of the other of said interfaces. The communicating device detector is adapted to detect a second remote device communicating according to a remote communication protocol different from the communication protocol used by said remote communication interface. The protocol bridge interrupts the transaction with the received smartcard when the second remote device communicating according to said different remote communication protocol is detected.

SUMMARY

According to an embodiment, the protocol bridge automatically interrupts the transaction when said second remote device is detected.

According to a further embodiment, said contact interface complies with ISO 7816 standards requirements.

According to another embodiment, said remote communication interface is a wireless communication interface.

According to an embodiment, said remote communication interface complies with IEEE 802.15 standards requirements.

According to another embodiment, said detector is adapted to detect a second remote communication device communicating with a contactless communication protocol.

According to a further embodiment, said detector is adapted to detect a second remote communication device communicating with a communication protocol complying with ISO 14443 standards requirements.

According to an embodiment, the detector is adapted to:
  receive a signal having a modulation frequency corresponding to the modulation frequency of the different remote communication protocol;
  determine the amplitude of the received signal;
  compare the determined amplitude to a threshold;
  indicating a remote communication device detection to the protocol bridge when the determined amplitude is superior to said threshold.

According to another embodiment, said threshold is set as a proportion of the amplitude of the signal received on said remote communication interface.

According to a further embodiment the detector comprises:
an antenna;
a band-pass filter, its bandwidth including the different remote communication protocol modulation frequency;
a rectifier receiving the filtered signal;
a comparator receiving the rectified signal.

The invention also relates to a communication system, comprising:
a smartcard including:
a contact interface;
a remote communication interface communicating through a first remote communication protocol; and
a controller allowing a communication only through one of these interfaces at a time;
a smartcard receiving device, comprising:
a contact interface for communicating with said smartcard;
a remote communication interface for communicating with a first remote device through a second remote communication protocol different from the first remote communication protocol;
a protocol bridge designed to establish a transaction with said smartcard through the smartcard receiving device contact interface and to translate the data received according to the protocol of one of its interfaces into the protocol of the other of its interfaces;
a communicating device detector adapted to detect a second remote device communicating according to the first remote communication protocol;
said protocol bridge interrupting the transaction with the smartcard when the second remote device is detected.

The invention additionally relates to a method for interrupting a transaction performed through their respective contact interfaces by a smart card with a device hosting said smartcard, said hosting device bridging the smartcard communication with a first remote device through a remote communication interface using a first remote communication protocol, the method comprising:
during said transaction, the hosting device detects a second remote device communicating according to a second remote communication protocol different from the first communication protocol;
the hosting device interrupts said transaction when said second remote communication device is detected.

In an embodiment, said smart card establishes a transaction with the second remote device when the transaction with the hosting device through the contact interfaces is interrupted.

In another embodiment, said smart card is a dual interface smartcard having a controller allowing a communication only through one of the smartcard communication interfaces at a time.

BRIEF DESCRIPTION OF THE DRAWINGS

The advantage of the present invention will become apparent from the following description of several embodiments with reference to the accompanying drawings, in which.

DETAILED DESCRIPTION

The invention proposes to interrupt a transaction between a receiving device and a smartcard, when the receiving device is in bridge mode, upon detecting a new remote communicating device adapted to communicate with the remote communication interface of the smartcard.

Thereby, the user does not have to interrupt the transaction by accessing the device previously in remote communication with the receiving device. The user simply has to approach the receiving device near enough from the new remote communicating device to end a potential communication between the receiving device and the previously communicating device and to have a new remote transaction performed.

Figure 1:
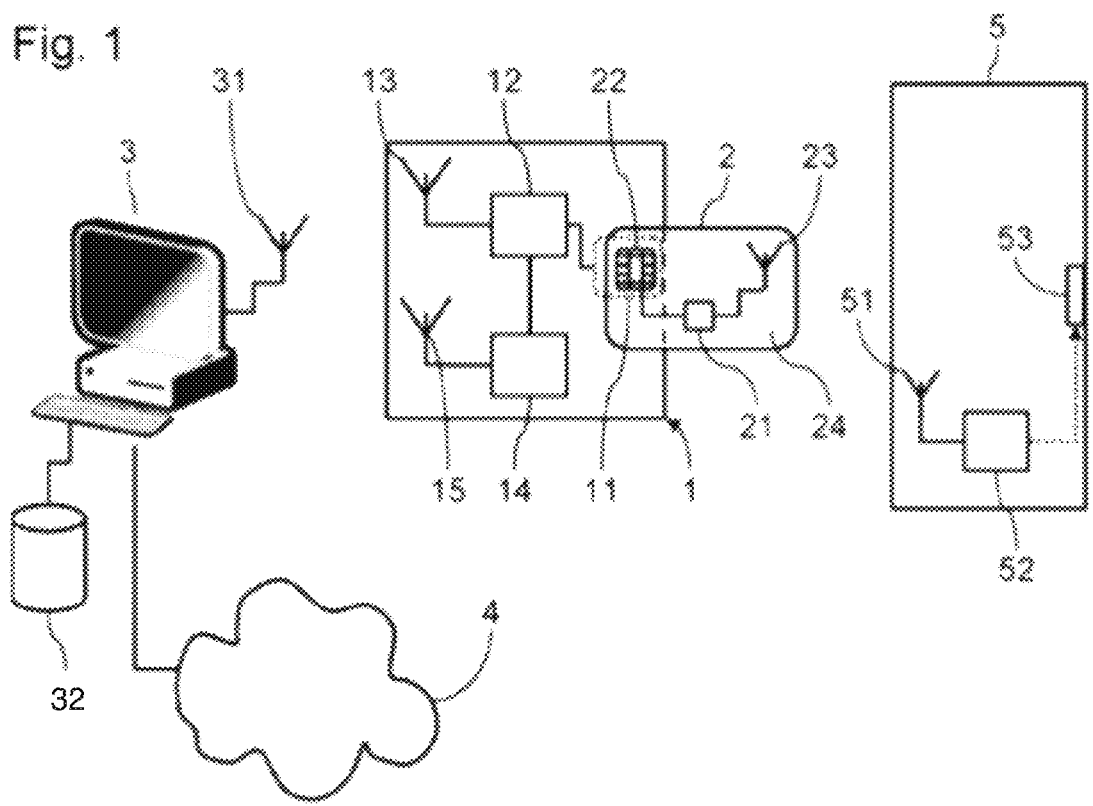
FIG. 1 is a schematic view of a system including a smartcard receiving device according to an embodiment of the invention.

FIG. 1 is a schematic view of a communication system including a smartcard 2, a smartcard receiving device 1, a user terminal 3 and a contactless communicating device 5.

The smartcard 2 includes a plastic card 24 embedding a smartcard chip 21. The smartcard chip 21 is an integrated microcontroller comprising a central processing unit, a random access memory, a ROM memory and an EEPROM memory (not illustrated). The smartcard 2 is adapted to store sensitive information such as cryptographic keys or software routines, in order to perform ciphering or authentication processes.

The smartcard 2 is a dual interface smartcard. The smartcard is provided with a contact interface 22 and with a remote communication interface 23. The contact interface 22 is for instance compliant with the ISO 7816 standard requirements. The remote communication interface 23 is for instance a contactless communication interface. This contactless communication interface may be for instance compliant with the ISO 14443 standard requirements. The integrated microcontroller is connected to both communication interfaces 22 and 23 to perform transactions. The integrated microcontroller can handle only one communication at a time, either through the contact interface 22 or through the contactless interface 23. The smartcard 2 is a multi purpose smartcard, providing several authentication possibilities. The smartcard 2 notably allows a user authentication to access a computer network 4 through the user terminal 3 and allows the user to unlock the security door 5.

The smartcard receiving device 1 is for instance an access badge. The smartcard receiving device 1 includes a remote communication interface 13, a contact interface 11 and a protocol bridge circuit 12. The remote communication interface 13 can be a wireless communication interface. The smartcard receiving device 1 further comprises an antenna 15 and a detector 14 for detecting a contactless communicating device adapted to communicate with the smartcard 2 through its contactless interface 23. The detector 14 is connected to the protocol bridge 12.

The communication range provided by the communication interface 23 and its associated communication protocol may be lower (for instance at least 10 times lower) than the communication range provided by the communication interface 13 and its associated communication protocol. A contactless interface practically identifies a remote communication interface having a communication range reaching several centimeters. A wireless interface practically identifies a remote communication interface having a communication range reaching several meters to several tens of meters.

The protocol bridge 12 performs functions known from someone skilled in the art: the protocol bridge 12 is designed to establish a transaction with a received smartcard 2 and to allow this smartcard 2 to communicate with wireless devices through the wireless interface 13.

The use of the smartcard 2 for an access to the secured computer network 4 will now be disclosed. A user can access the secured computer network 4 through a user terminal 3. The user terminal 3 includes a wireless communication interface 31, for instance compliant with Bluetooth standards, such as recited in the IEEE 802.15 requirements. The wireless communication interface 31 may also comply with other standards, such as Wi-Fi standards. The user terminal 3 also includes a data storage device 32. Authentication tools are stored in the data storage device 32 and can be executed by the user terminal 3 to provide an access to the secured network 4. Authentication techniques to a secured network being known from someone skilled in the art, they will not be discussed further.

When the smartcard 2 is received in device 1, the contact interface 22 is connected to the contact interface 11. The protocol bridge 12 detects the presence of the smartcard 2 either through a contact sensor or through exchanges between the contact interfaces 11 and 22. The user may request access to the secured network 4 using the user terminal 3. At that stage, the receiving device 1, for instance hosted in a pocket of the user, is in the communication range of the wireless interface 31. This request is sent through the wireless interface 31 and received on the wireless interface 13. Further to the received request, the protocol bridge 12 establishes a transaction with smartcard 2 through its contact interface 11. The user terminal 3 and the smartcard 2 communicate through the protocol bridge 12. The protocol bridge 12 translates the data received from the smartcard 2 on the contact interface 11 into the protocol of its wireless interface 13. The protocol bridge 12 translates the data received from the user terminal 3 on the wireless interface 13 into the protocol of its contact interface 11. The protocol bridge 12 maintains the transaction with the smartcard 2 as long as the device 1 is in vicinity of the wireless interface 31. During this transaction, the smartcard 2 is unable to process another transaction. The access to the secured network 4 is maintained while the device 1 is still in vicinity of the wireless interface 31.

The device 1 is adapted to interrupt the transaction between the smartcard 2 and the device 1, in order to allow the smartcard 2 to perform a transaction with another remote communicating device, a contactless device. The antenna 15 is tuned to receive signals originating from a contactless device communicating using a specific communication protocol, compliant to the ISO 14443 standard requirements in the present case. The detector 14 is designed to detect the presence of such a contactless device in vicinity of the device 1. In the case of the ISO 14443 standard, the detection range amounts several centimeters. The proximity of a contactless device is assessed as a request to carry out a new transaction using the contactless interface 23 of the smartcard 2. Thus, when such a contactless device is detected, the detector 14 sends a signal to the protocol bridge 12. When the protocol bridge 12 receives this signal, it interrupts the transaction between the smartcard 2 and the device 1. Once this transaction is interrupted, the smartcard 2 is able to establish a new transaction with the contactless device.

In the present case, the contactless device is a door 5. The door 5 is provided with a contactless communication interface 51, adapted to communicate with the contactless interface 23 of the smartcard 2. The contactless communication interface 51 is connected to a control circuit 52. The control circuit 52 controls an electronic lock 53. The control circuit 52 can thereby selectively open or lock the door 5. The door 5 can thereby prevent persons to leave/enter a restricted area before they are validly authenticated.

If the user gets close enough to the communication interface 51, the door 5 is detected by the detector 14 as a communicating device with which a transaction with the smartcard 2 is requested. This transaction can be performed to authenticate the user carrying his smartcard 2 once the transaction between the smartcard 2 and the device 1 is interrupted.

The detector 14 advantageously receives a signal having a modulation frequency corresponding to the modulation frequency of the communication protocol of the contactless interface 51. The amplitude of this signal is determined. The determined amplitude is compared to a detection threshold. If the amplitude of the signal is superior to this threshold, the detector 14 indicates to the protocol bridge 12 that a contactless device has been detected. This threshold can be set quite high, in order to avoid interrupting the transaction between the smartcard 2 and the device 1 if the user does not intend to cross the door 5 and be authenticated by this door. The transaction between the smartcard 2 and the device 1 can be automatically interrupted if the contactless interface 51 is detected by the detector 14.

Figure 2:
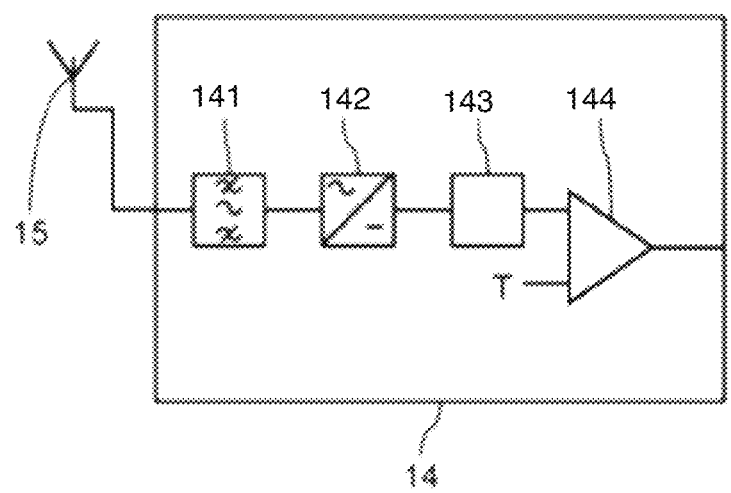
FIG. 2 is a schematic view of a detector integrated in the smartcard receiving device of FIG. 1.

FIG. 2 is a schematic view of an embodiment of a detector circuit 14 that can be included in the device 1. The detector circuit 14 includes a band-pass filter 141 connected to the antenna 15. The band-pass filter 141 keeps a frequency band including the modulation frequency corresponding to the modulation frequency of the contactless interface 51. The band-pass filter 141 filters out the frequency bands that do not correspond to that modulation frequency. The filtered signal is applied on the input of a rectifier 142. The rectified signal is advantageously applied on the input of a smoothing circuit 143. The smoothed voltage is applied on an input of a comparator 144. The smoothed voltage is compared to a threshold T applied on another input of the comparator 144. If the smoothed signal is superior to the threshold T, a detection signal is generated and applied to the protocol bridge 12. The detection range of the antenna 15 is advantageously significantly lower than the communication range of the interface 13, in order to avoid unwanted transaction interruptions.

In order to take the level of the communication signal originating from the wireless interface 31 into account, the threshold T can be notably set as a function of the amplitude of this signal. For instance, the threshold T can be set proportional to the signal originating from the wireless interface 31.

The invention has been disclosed in relation with a badge reader as the receiving device 1. However, the invention also applies with other kinds of receiving devices, such as a mobile phone or a personal data assistant.

The invention claimed is:

1. A device for receiving a smartcard capable of contact and contactless communication according to a first remote communication protocol, comprising:
   a contact interface (11) for communicating with the received smartcard (2);
   a remote communication interface (13) for communicating with a first remote device (3) according to a second remote communication protocol different from said first remote communication protocol;

a protocol bridge (12) to receive data from the remote communication interface (13) and designed to establish a transaction with the received smartcard (2) through the contact interface (11) and to translate the data received according to the second protocol from the remote communication interface into a protocol of the contact interface;

a communicating device detector (14, 15) adapted to detect a second remote device (5) communicating according to the first remote communication protocol;

said protocol bridge (12) interrupting the transaction with the received smartcard (2) when the second remote device (5) communicating according to said first remote communication protocol is detected, thereby allowing said received smartcard to communicate with the second remote device according to said first remote communication protocol.

2. The device according to claim 1, wherein the protocol bridge (12) automatically interrupts the transaction when said second remote device (5) is detected.

3. The device according to claim 1, wherein said contact interface (11) complies with ISO 7816 standards requirements.

4. The device according to claim 1, wherein said remote communication interface (13) is a wireless communication interface.

5. The device according to claim 4, wherein said remote communication interface (13) complies with IEEE 802.15 standards requirements.

6. The device according to claim 1, wherein said detector (14, 15) is adapted to detect the second remote communication device (5) communicating with a contactless communication protocol.

7. The device according to claim 6, wherein said detector (14, 15) is adapted to detect a second remote communication device (5) communicating with a communication protocol complying with ISO 14443 standards requirements.

8. The device according to claim 1, wherein the first communication protocol has a first communication range and the second communication protocol has a second communication range, wherein the second protocol, used by the remote communication interface (13), has a communication range superior to the communication range of the first communication protocol.

9. The device according to claim 1, wherein the detector (14, 15) is adapted to:
receive a signal having a modulation frequency corresponding to the modulation frequency of the second remote communication protocol;
determine the amplitude of the received signal;
compare the determined amplitude to a threshold;
indicating a remote communication device detection to the protocol bridge (12) when the determined amplitude is superior to said threshold.

10. The device according to claim 9, wherein said threshold is set as a proportion of the amplitude of the signal received on said remote communication interface.

11. The device according to claim 1, wherein the detector (14, 15) comprises:
an antenna (15);
a band-pass filter (141) having a bandwidth including the first remote communication protocol modulation frequency and producing a filtered signal;
a rectifier (142) receiving the filtered signal and producing a rectified signal;
a comparator (144) receiving the rectified signal.

12. A communication system, comprising:
a smartcard (2) including:
a contact interface (22);
a remote communication interface (23) communicating through a first remote communication protocol; and
a controller (21) allowing a communication only through one of the contact interface (22) or the remote communication interface (23) at a time;
a smartcard receiving device (1), comprising:
a contact interface (11) for communicating with said smartcard (2);
a remote communication interface (13) for communicating with a first remote device (3) through a second remote communication protocol different from the first remote communication protocol;
a protocol bridge (12) designed to establish a transaction with said smartcard (2) through the smartcard receiving device contact interface (11) and to translate data received according to the second communication protocol into a protocol of the contact interface;
a communicating device detector (14, 15) adapted to detect a second remote device (5) communicating according to the first remote communication protocol;
said protocol bridge (12) interrupting the transaction with the smartcard (2) when the second remote device (5) is detected, thereby allowing said received smartcard to communicate with the second remote device according to said first remote communication protocol.

13. A method for interrupting a transaction between a smart card and a device hosting the smart card, the transaction performed through a contact interface of the smart card and a contact interface of the device hosting said smartcard, the smart card also capable of communicating according to a first communications protocol, said hosting device bridging the smartcard communication with a first remote device through a remote communication interface using a second remote communication protocol, the method comprising:
during said transaction, the hosting device detects a second remote device communicating according to the first remote communication protocol different from the second communication protocol;
the hosting device interrupts said transaction through the contact interfaces of said smart card and said device hosting the smart card when said second remote communication device is detected, thereby allowing said smartcard to communicate with the second remote device according to said first remote communication protocol.

14. The method according to claim 13, wherein said smart card establishes a transaction with the second remote device when the transaction with the hosting device through the contact interfaces is interrupted.

15. The method according to claim 13, wherein said smart card is a dual interface smartcard having a controller (21) allowing a communication only through one of the smartcard communication interfaces at a time.

* * * * *